United States Patent [19]

Dörr et al.

[11] 3,853,502

[45] Dec. 10, 1974

[54] METHOD OF REMOVING SO₃ AND H₂SO₄ MIST FROM A GAS STREAM

[75] Inventors: Karl-Heinz Dörr, Mainz; Hugo Grimm, Frankfurt am Main; Michael Tacke, Offenbach; Robert Peichl, Kelheim, all of Germany

[73] Assignees: Metallgesellschaft Aktiengesellschaft, Frankfurt am Main; Sud-Chemie AG, Munich, both of Germany

[22] Filed: Sept. 7, 1972

[21] Appl. No.: 287,104

[30] Foreign Application Priority Data
Sept. 11, 1971 Germany.......................... 2145546

[52] U.S. Cl....................................... 55/48, 55/73
[51] Int. Cl............................................ B01d 53/14
[58] Field of Search............................ 55/73, 48, 51

[56] References Cited
UNITED STATES PATENTS
2,947,383  8/1960  Schytil et al.......................... 55/73
3,593,497  7/1971  Grimm et al.......................... 55/73

Primary Examiner—Charles N. Hart
Attorney, Agent, or Firm—Karl F. Ross; Herbert Dubno

[57] ABSTRACT

A method of removing sulfur trioxide ($SO_3$) and sulfuric-acid mist from the end gas of a contact-catalysis process for the production of sulfuric acid involves intimately contacting the dry end gas, containing $SO_3$ and/or sulfuric acid mist, with a water-diluted sulfuric-acid treating solution to increase the water-vapor content of the end gas in accordance with the vapor pressure of water in the dilute acid. The liquid phase, consisting of sulfuric acid present in the treating solution, formed by dissolution of $SO_3$ in water and present as the sulfuric acid mist, is removed or separated from the gas which is released into the atmosphere substantially free from sulfuric acid or $SO_3$.

4 Claims, 2 Drawing Figures

METHOD OF REMOVING $SO_3$ AND $H_2SO_4$ MIST FROM A GAS STREAM

FIELD OF THE INVENTION

The present invention relates to a method of or a process for removing sulfur trioxide gas ($SO_3$) and/or sulfuric-acid mist ($H_2SO_4$) from the dry end gases produced by contact-catalyst processes for the manufacture of sulfuric acid.

BACKGROUND OF THE INVENTION

In the production of sulfuric acid by the contact-catalysis process, sulfuric dioxide ($SO_2$) is catalytically converted to sulfur trioxide ($SO_3$) which is then absorbed in sulfuric acid. Contact-catalysis plants, operating to produce sulfuric acid by the contact process, also discharge end gases which always contain some sulfur trioxide and/or sulfuric-acid mists. The term "end gas" thus refers, in contact-catalysis processes, to the gases which emerge from the absorber stage and, where a plurality of such absorber stages is present, from the last absorber stage. To minimize air pollution, removal of substantially all traces of $SO_3$ and/or $H_2SO_4$ mist is essential.

Various techniques have been provided heretofore to reduce the $SO_3$ or $H_2SO_4$ level in the end gas before it is discharged into the atmosphere. Such systems include mechanical filters which are able to remove only particles of sulfuric-acid mist with a particle size in excess of 2 microns. Smaller particles may be trapped upon high-density glass wool, quartz wool or candle filters which clog readily, cause high pressure drops and generally involve high capital and operating costs.

Electrostatic precipitators are also capable of removing fine mist droplets although corrosion or the possibility of flash through has reduced practical application of such filters where gases containing $SO_3$ and $H_2SO_4$ are involved. Scrubbers have been proposed for the washing of such gases with water, these systems haVing been found to be economically impractical because the product is an ultradilute sulfuric acid having no suitable further utility. Scrubbing techniques also require high pressures and, for this reason as well, have not been found a practical application in the cleaning of the end gases of a contact-catalysis plant.

There also may be mentioned processes which involve adsorption of the corrosive components of a contact-process end gas on various adsorptive solids. The capital and operating costs of such processes are also high and the solids must be regenerated at extra cost.

OBJECTS OF THE INVENTION

It is the principal object of the present invention to provide a method of or process for removing $SO_3$ and/or sulfuric-acid mist from the end gas of a contact-catalysis plant for the production of sulfuric acid in such a manner as to provide a useful product and with a minimum of cost.

It is another object of the present invention to provide an improved method of removing $SO_3$ and sulfuric-acid mist from the dry end gas of a sulfuric-acid plant which enables a high degree of removal of these contaminants, which yields a product which can be used directly, (i.e., without further treatment), which requires low operating and capital expenditures and which, in general terms, is simple and inexpensive.

SUMMARY OF THE INVENTION

These objects and others which will become apparent hereinafter are attained, in accordance with the present invention, which is based upon the discovery that, when the dry end gas of a sulfuric-acid plant operating by the contact-catalysis process, is intimately contacted with a dilute sulfuric-acid solution, the gas is enriched in water vapor to an extent determined by the vapor pressure of water in the dilute acid, sulfur trioxide in the end gas is dissolved in the water phase to form sulfuric acid and all of the acid, including that formed in situ from the sulfur trioxide, that provided by the treating solution, and that which is present originally in the form of sulfuric-acid mist, may be recovered as an aqueous phase.

According to the principles of the present invention, therefore, sulfuric acid which has been diluted with water is injected into a stream of the end gas to enrich the latter with water vapor in dependence upon the water vapor partial pressure in the dilute sulfuric acid, the sulfuric acid contained in the end gas after such injection and the sulfuric acid formed in the end gas from $SO_3$ is removed, and the remaining gas, which contains water vapor, is discharged as an exhaust gas.

The basic feature of the invention can thus be viewed in terms of a three-step process consisting of:

a. intimately contacting the dry contact-process end gas with a water-diluted sulfuric-acid treating solution to increase the water-vapor content of the end gas and convert $SO_3$ therein to sulfuric acid;

b. thereafter separating liquid and gas phases formed in step (a) to recover sulfuric acid as the liquid phase; and c. discharging the gas phase after step (b) as a water-enriched exhaust gas substantially free from sulfuric acid.

According to a further feature of the invention, the dilute acid which is contacted with the end gas of the sulfuric acid production process is a waste acid obtained from a location elsewhere in the sulfuric acid production process or derived from some other industrial or chemical process. This is a surprising advantage because it has been found that the waste acid may be contaminated or may contain impurities. The impurities have not been found to limit the use of such waste acids for the present purposes. When waste acid is derived from the contact process, it may be obtained from a gas-purifying or predrying unit. Examples of other processes from which the waste acid may be obtained are metallurgical processes in which ores are roasted, chemical processes in which an acid is used to digest a sulfate, and systems in which sulfuric acid may be used to trap substances contained in a gas stream and in which the product retains sulfuric acid character. Preferably part of the sulfuric acid which is recovered as the aqueous phase from contact with the gas is recycled into contact with further quantities of the end gas containing sulfuric-acid mist or sulfur trioxide. The recycling and reinjection step has been found to yield a higher concentration of acid as the product of the present separation process.

It has been found to be advantageous to inject the dilute sulfuric acid into the end gas containing sulfur trioxide and/or sulfuric-acid mist, i.e., to discharge the liquid from a spray-type nozzle or other means causing subdivision of the liquid within the gas. Advantageously, the injection is carried out in a Venturi tube through which the end gas is caused to flow at least in part by the pressure drop brought about by the injection of the liquid. The term "Venturi tube" is used herein to define a system in which a constriction separates a low pressure side from a discharge side, the liquid and gas mixture expanding at the discharge or outlet side of the Venturi. The liquid may be introduced into the Venturi through a tube whose mouth opens just ahead of the constriction or within the latter.

It has also been discovered that optimum results can be obtained only with dilute sulfuric acid in a limited concentration range, namely, with a sulfuric acid having a concentration of $H_2SO_4$ between 20 and 90 percent by weight, preferably with a lower limit of 20 percent but most advantageously in the range of 65 – 75 percent by weight. The end gases are advantageously heated prior to passage through the Venturi. The end gases of a contact-catalyst process for the production of sulfuric acid are normally obtained at a temperature between 50° and 90°C. Where the temperature is lower, or if a greater increase in the final concentration of the liquid phase is desired, heating of the gas is carried out to a temperature in this range to thereabove. Suitable higher temperatures may range from 90° to 120°C. Heating of the gas results in a higher water-vapor concentration in the exhaust gas which is finally discharged.

It has also been found to be advantageous to carry out the separation of the two phases in part by passing the mixture formed in the Venturi through a packing layer, i.e., a porous layer of packing, e.g., raschig or like rings. The packing layer produces a particularly intimate mixing of the acid and gas while forming surface films of the liquid phase so that efficient removal can be effected. Best results are obtained when at least two and preferably several packing layers are provided in cascade. It has also been observed that increased efficiency of separation of sulfur trioxide and sulfuric acid mist from an end gas can be obtained when the sulfuric acid is injected into the gas at a plurality of stages. This effect has been found to be most pronounced when highly diluted acids are employed. In the first stage efficient removal of the sulfur trioxide and sulfuric acid mist can be carried out in an acid having a concentration of 65 – 75 percent by weight while a second stage may use an acid having a concentration of 80 – 40 percent by weight. As the concentration of this acid increases, it may be transferred to the previous stage. During the interaction of the gas with the dilute acid, it is preferred to pass the acid and the gas in the same direction (concurrent flow).

DESCRIPTION OF THE DRAWING

The above and other objects, features and advantages of the present invention will become more readily apparent from the following description, reference being made to the accompanying drawing in which.

SPECIFIC DESCRIPTION

Figure 1:
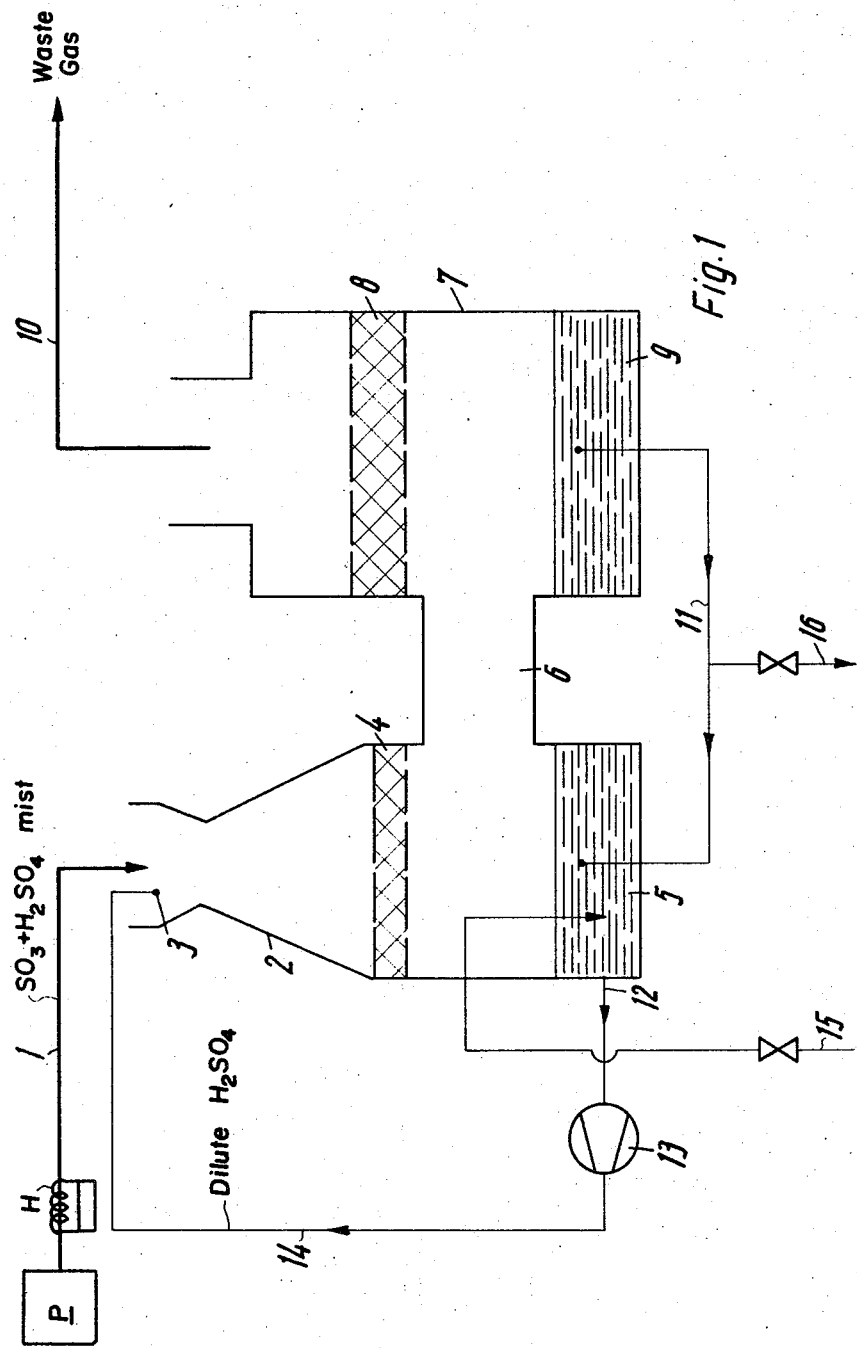
FIG. 1 is a flow diagram representing a single-stage removal of sulfur trioxide and sulfuric-acid mist from the end gas of a contact-catalyst sulfuric acid plant.

In FIG. 1 of the drawing, there is shown a system for the removal of sulfur trioxide and sulfuric acid mist from the end gas of a contact-catalyst plant for the production of sulfuric acid, the end gas containing residual oxygen and possibly nitrogen in addition to the contaminants, namely $SO_3$ and $H_2SO_4$. The contact-catalysis plant is represented at P and is connected with the separation stage by a conduit 1 which may be provided with a heating coil H to preliminarily raise the temperature of the gas. From the conduit 1, the gas is admitted into a Venturi tube 2, at least in part being induced to flow therethrough by the dilute sulfuric acid injected in a finely divided state into the Venturi nozzle by the spray nozzle 3. The gas/acid mixture formed in the Venturi tube then traverses the packing layer 4, e.g., of raschig rings, in which the gas phase is more intimately mixed with the liquid phase and the liquid phase collects in part as a liquid film on the surface of the packing bodies. The liquid drips from the packing layer into the sump 5 and as a result of cooling and expansion in the initial stage, additional liquid condenses and is collected in the sump. The gas phase, freed from a major part of the sulfuric acid deriving from the dilute acid, from dissolution of sulfur trioxide therein and from the sulfuric acid mist, is deflected at right angles to pass through a conduit 6 into a second collecting chamber 7. Residual acid is removed from the gas in a packing layer 8 which is traversed by the gas as it is again deflected at right angles and is carried away through conduit 10 into a chimney. The sump 9 at the base of chamber 7 is connected to the sump 5 by a conduit 11.

A pump 13 recirculates the collected liquid phase to the nozzle 3 and more concentrated sulfuric acid may be drawn off as a product acid through conduit 16. Water or dilute acid is supplied by a conduit 15 to the sump 5 to maintain a constant concentration of the acid injected at the nozzle 3.

Figure 2:
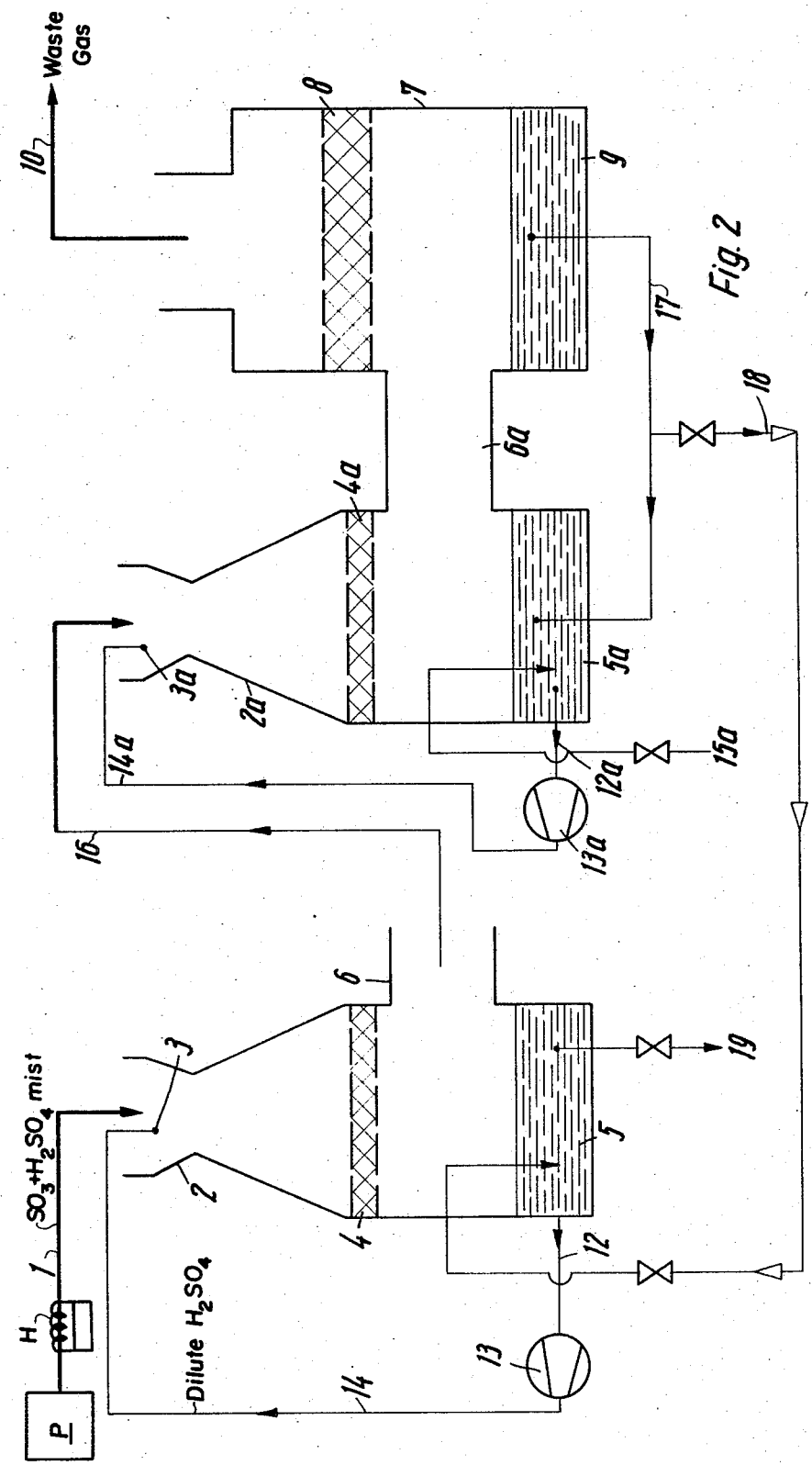
FIG. 2 is a similar diagram representing a two-stage process.

In the system of FIG. 2 the first stage is identical to that of FIG. 1 and hence similar parts are identified by identical reference numerals. In this embodiment, however, a conduit 6 is connected to a duct 16 which leads the gas phase, partly stripped of sulfur trioxide and sulfuric acid, into a second Venturi tube into which additional diluted acid is injected via the nozzle 3a. The subsequent separation is carried out in a chamber 7 as described in connection with FIG. 1. The sump 9, however, is connected via conduit 17 to the sump 5a below a packing layer 4a downstream of Venturi 2a. A further conduit 18 is used to convey the less concentrated acid of the second stage to the sump 5 of the first stage, the more concentrated or product acid being withdrawn through a conduit 19.

SPECIFIC EXAMPLE

The following tables illustrate results obtained respectively with the systems of FIGS. 1 and 2.

Table 1

|  | A | B | C | D | E |
|---|---|---|---|---|---|
| Gas inlet (conduit 1) | | | | | |
| Volume, standard cubic meters per hour | 2700 | 2700 | 3350 | 2700 | 2700 |
| Temperature, °C. | 88 | 77 | 81 | 82 | 82 |
| Mist content + $SO_3$, milligrams $SO_3$ per standard cubic meter | 470 | 122 | 270 | 288 | 280 |

Table 1 — Continued

|  | A | B | C | D | E |
|---|---|---|---|---|---|
| Acid (conduit 14) | | | | | |
| Volume, standard cubic meters per hour | 1.9 | 1.9 | 1.9 | 1.9 | 1.9 |
| Concentration, % by weight $H_2SO_4$ | 74.4 | 73.64 | 67.8 | 45.4 | 85.6 |
| Temperature, °C. | 65 | 68 | 61 | 43 | 72 |
| Gas outlet (conduit 10) | | | | | |
| Temperature, °C. | 66 | 63 | 58 | 39 | 72 |
| Mist content + $SO_3$, milligrams $SO_3$ per standard cubic meter | 2.9 | 0.5 | 1.85 | 14.5 | 10.9 |
| Water vapor content, grams $H_2O$ per standard cubic meter | 10.3 | 4.5 | 11.65 | 22.6 | 5.2 |
| Total pressure drop, millimeters water | 159 | 110 | 260 | 155 | 165 |
| Efficiency, % | 99.4 | 99.6 | 99.3 | 95 | 96.1 |
| Addition of water (conduit 15), liters per hour | 29 | 12.5 | 40 | 62 | 14 |
| Product (conduit 16), liters per hour | 1.55 | 0.31 | 1.63 | 2 | 0.59 |
| Product (conduit 16), % by weight $H_2SO_4$ | 74.5 | 73.6 | 67.8 | 45.2 | 85.6 |

Table 2

|  | Without Preheating | With Preheating |
|---|---|---|
| Total pressure loss, millimeters water | 180 | 190 |
| Gas inlet (conduit 1) | | |
| Volume, standard cubic meters per hour | 2700 | 2700 |
| Temperature, °C. | 80 | 120 |
| Mist content + $SO_3$, milligrams $SO_3$ per standard cubic meter | 299 | 122 |
| Acid (conduit 14) | | |
| Volume, standard cubic meters per hour | 1.9 | 1.9 |
| Concentration, % by weight $H_2SO_4$ | 69.5 | 70.0 |
| Temperature, °C. | 62 | 91 |
| Gas inlet (conduit 16) | | |
| Temperature, °C. | 62 | 90 |
| Water vapor content, grams $H_2O$ per standard cubic meter | 9.0 | 14.9 |
| Acid (conduit 14a) | | |
| Volume, cubic meters per hour | 1.9 | 1.9 |
| Concentration, % by weight $H_2SO_4$ | 40.0 | 40.0 |
| Temperature, °C. | 37 | 42 |
| Gas outlet (conduit 10) | | |
| Temperature, °C. | 35 | 40 |
| Mist content + $SO_3$, milligrams $SO_3$ per standard cubic meter | 9.6 | 1.0 |
| Degree of separation, % | 96.8 | 99.2 |
| Water vapor content, grams $H_2O$ per standard cubic meter | 18.0 | 40.4 |
| Acid (conduit 15a) | | |
| Rate, kilograms per hour | 95.4 | 162.6 |
| Concentration, % by weight $H_2SO_4$ | 23.9 | 23.1 |
| Acid (conduit 18) | | |
| Rate, kilograms per hour | 57.1 | 93.7 |
| Concentration, % by weight $H_2SO_4$ | 40.0 | 40.0 |
| Acid (conduit 19) | | |
| Rate, kilograms per hour | 32.6 | 54.1 |
| Concentration, % by weight $H_2SO_4$ | 70.0 | 70.0 |

What is claimed is:

1. In the production of sulfuric acid wherein:
a gas stream containing sulfur dioxide is subjected to contact catalysis to form sulfur trioxide therein,
the sulfur trioxide is at least in part removed from the gas stream by absorption in at least one absorber stage by effecting contact of the gas stream with sulfuric acid therein, and
a dry contact-process end gas containing sulfur trioxide and/or sulfuric acid mist emerges from the final absorber stage, the improvement which consists of a method of removing sulfur trioxide and/or sulfuric acid mist from said dry contact-process end gas, said improvement comprising the steps of:
a. intimately contacting said dry-process end gas subsequent to the final absorber stage with a water-diluted sulfuric acid treating solution having a sulfuric acid concentration of 40 to 90 percent by weight to increase the water-vapor content of said end gas, to convert sulfur trioxide therein to sulfuric acid and to convert sulfuric acid mist therein to separable sulfuric acid droplets, and
to form a mixture of sulfuric acid liquid phase and a gas phase, said water-diluted sulfuric acid treating solution being injected into said end gas in a downwardly directed Venturi tube to produce a downwardly flow of said mixture of said phases, and further passing said downwardly flowing mixture through a packing layer downstream of said Venturi tube;
b. separating the liquid and gas phases formed in step (a) subsequent to the contact of said drying contact-process end gas with said sulfuric acid treating solution having said sulfuric acid concentration of 40 to 90 percent by weight to recover sulfuric acid as the liquid phase, said liquid and gas phases being separated by collecting part of said liquid phase below said packing layer, deflecting said gas phase at right angles downstream of said packing layer, and passing said deflected gas stream through a further packing layer for removal of additional quantities of said liquid phase therefrom;

c. discharging the gas phase after separation of the liquid phase therefrom in step (b) as an exhaust gas substantially free from sulfuric acid; and heating said end gas prior to contact of said treating solution therewith in step (a) and subsequent to said final absorber stage.

2. The improvement defined in claim 1 wherein said treating solution having said concentration of sulfuric acid of 40 to 90 percent by weight is a waste acid.

3. The improvement defined in claim 1, further comprising the step of recycling part of the liquid phase recovered in step (b) to step (a) as said treating solution.

4. The improvement defined in claim 3 wherein said treating solution has a sulfuric acid concentration of 65 to 75 percent by weight.

* * * * *